United States Patent
Miyazaki et al.

(10) Patent No.: US 11,953,473 B2
(45) Date of Patent: Apr. 9, 2024

(54) AUTOSAMPLER

(71) Applicant: SHIMADZU CORPORATION, Kyoto (JP)

(72) Inventors: Koki Miyazaki, Kyoto (JP); Kodai Imaeda, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 450 days.

(21) Appl. No.: 17/289,834

(22) PCT Filed: Nov. 5, 2018

(86) PCT No.: PCT/JP2018/040996
§ 371 (c)(1),
(2) Date: Apr. 29, 2021

(87) PCT Pub. No.: WO2020/095345
PCT Pub. Date: May 14, 2020

(65) Prior Publication Data
US 2021/0404997 A1 Dec. 30, 2021

(51) Int. Cl.
G01N 30/24 (2006.01)
G01N 1/00 (2006.01)
(Continued)

(52) U.S. Cl.
CPC .......... G01N 30/24 (2013.01); G01N 1/42 (2013.01); G01N 1/44 (2013.01); G01N 35/00 (2013.01);
(Continued)

(58) Field of Classification Search
CPC ....... B01L 2200/147; B01L 2300/1822; B01L 2300/1844; B01L 7/00; G01N 1/10;
(Continued)

(56) References Cited

U.S. PATENT DOCUMENTS

2015/0003494 A1* 1/2015 Yokoyama ............... G01N 1/44
73/863.11
2016/0274011 A1 9/2016 Maeda
(Continued)

FOREIGN PATENT DOCUMENTS

JP 2016-176749 A 10/2016
JP 2019-219203 A 12/2019
(Continued)

OTHER PUBLICATIONS

International Search Report for corresponding Application No. PCT/JP2018/040996, mailed Jan. 15, 2019.
(Continued)

Primary Examiner — John Fitzgerald
Assistant Examiner — Truong D Phan
(74) Attorney, Agent, or Firm — Renner, Otto, Boisselle & Sklar, LLP

(57) ABSTRACT

A circulation device causes gas to circulate between a sample storage space and a temperature adjustment space through the first and second opening regions in a separating member. A temperature of gas flowing in the temperature adjustment space is adjusted by a heat exchanger, so that the temperature of gas surrounding a sample in the sample storage space is adjusted. The separating member further has first and second unit regions. The second opening region includes a first portion located in the first unit region and a second portion located in the second unit region. The shortest distance between the first portion and the first opening region is larger than the shortest distance between the second portion and the first opening region, and an aperture ratio of the first portion in the first unit region is larger than an aperture ratio of the second portion in the second unit region.

6 Claims, 6 Drawing Sheets

(51) Int. Cl.
  *G01N 1/42* (2006.01)
  *G01N 1/44* (2006.01)
  *G01N 30/02* (2006.01)
  *G01N 35/00* (2006.01)

(52) U.S. Cl.
  CPC . *G01N 2001/002* (2013.01); *G01N 2030/025* (2013.01); *G01N 2030/027* (2013.01); *G01N 2035/00386* (2013.01)

(58) Field of Classification Search
  CPC .... G01N 1/28; G01N 2030/027; G01N 30/24; G01N 30/54; G01N 2030/121; G01N 30/26; G01N 30/28; G01N 30/30; G01N 2030/303; G01N 2001/2282; G01N 25/145; G01N 25/4826; G01N 2035/00346; G01N 2035/00445; G01N 2223/31; G01N 2223/3103; G01N 2001/2261; G01N 2021/158; G01N 2291/0253; F25B 47/006; F25D 21/04
  See application file for complete search history.

(56) References Cited

U.S. PATENT DOCUMENTS

2019/0383844 A1  12/2019  Miyazaki
2019/0383845 A1  12/2019  Miyazaki

FOREIGN PATENT DOCUMENTS

JP  2019-219205 A  12/2019
WO  2019/244198 A1  12/2019

OTHER PUBLICATIONS

Written Opinion for corresponding Application No. PCT/JP2018/040996, mailed Jan. 15, 2019 (machine translation).
Office Action in corresponding Chinese Patent Application No. 201880098914.2 dated Nov. 1, 2023, with English machine translation.

* cited by examiner

AUTOSAMPLER

TECHNICAL FIELD

The present invention relates to an autosampler that can be used by an analysis device such as a liquid chromatograph or a gas chromatograph.

BACKGROUND ART

In a chromatograph, an autosampler is used to inject a sample into a mobile phase supplied to a column. In the autosampler, a temperature adjustment function for maintaining a temperature of each sample at a predetermined constant temperature is provided in order to prevent alteration of a plurality of samples held by a sample plate, for example.

For example, in the autosampler described in Patent Document 1, with the sample plate placed on a plate holder, the sample plate is directly cooled by a cooling element provided in the plate holder. Thus, the temperature of the plurality of samples held by the plate holder is adjusted.
[Patent Document 1] JP 2016-176749 A

SUMMARY OF INVENTION

Technical Problem

While the temperature of the plurality of samples held by the sample plate can be adjusted in a relatively short period of time with the above-mentioned temperature adjusting method described in Patent Document 1 (hereinafter referred to as a direct temperature adjusting method), it is difficult to adjust the temperature of the entire sample plate to a uniform temperature. In a case where large variations are generated in temperature distribution of the sample plate, differences are generated in temperature of the plurality of samples respectively held by a plurality of portions of the sample plate.

In contrast to the above-mentioned direct temperature adjusting method, a method of adjusting the temperature of a sample by adjusting the temperature of air surrounding the sample plate (hereinafter referred to as an air temperature adjusting method) has been known. With the air temperature adjusting method, the temperature of the entire space surrounding the sample plate is adjusted, whereby variations in temperature distribution in the sample plate are reduced as compared to the direct temperature adjusting method. Thus, the temperatures of the plurality of samples can be adjusted easily to a uniform temperature. Also with the air temperature adjusting method, it is required to adjust the temperature of air highly efficiently in order to adjust the temperature of the plurality of samples held by the sample plate in a short period of time.

An object of the present invention is to provide an autosampler that can highly efficiently adjust a temperature in a space storing a sample.

Solution to Problem (1) An autosampler according to one aspect of the present invention includes a sample storage having a sample storage space, an adjustor having a temperature adjustment space, a separating member that has a first opening region and a second opening region and separates the sample storage space and the temperature adjustment space from each other, a circulation device that causes gas to circulate between the sample storage space and the temperature adjustment space through the first opening region and the second opening region, and a heat exchanger that adjusts a temperature of gas flowing in the temperature adjustment space, wherein the separating member has first and second unit regions, the second opening region includes a first portion located in the first unit region and a second portion located in the second unit region, a shortest distance between the first portion and the first opening region is larger than a shortest distance between the second portion and the first opening region, and an aperture ratio of the first portion in the first unit region is larger than an aperture ratio of the second portion in the second unit region.

In the autosampler, the circulation device causes gas to circulate between the sample storage space and the temperature adjustment space through the first and second opening regions. At this time, the temperature of gas flowing in the temperature adjustment space is adjusted by the heat exchanger. Thus, the temperature of gas surrounding the sample in the sample storage space is adjusted.

During the temperature adjustment of gas by the heat exchanger, a portion of a circulating gas flows through a portion (hereinafter referred to as a first space portion) located between the first portion in the second opening region and the first opening region of the separating member in the temperature adjustment space. Further, another portion of the circulating gas flows through a portion (hereinafter referred to as a second space portion) located between the second portion in the second opening region and the first opening region of the separating member in the temperature adjustment space.

Here, the shortest distance between the first portion in the second opening region and the first opening region of the separating member is larger than the shortest distance between the second portion in the second opening region and the first opening region of the separating member. In this case, when gas flows between the first opening region and the second opening region, a difference is generated between a pressure in the first space portion and a pressure in the second space portion. Therefore, a flow rate of gas flowing in the first space portion tends to be smaller than a flow rate of gas flowing in the second space portion.

In regard to such tendency, with the above-mentioned configuration, because the aperture ratio of the first portion is larger than the aperture ratio of the second portion, a flow rate of gas flowing in the first space portion can be increased. Thus, the flow rates of gas flowing in the first and second space portions can be made uniform. Therefore, the temperatures of gas flowing in the first and second space portions can be adjusted to a uniform temperature, and efficiency of temperature adjustment by the heat exchanger is improved. As a result, the temperature in the sample storage space can be adjusted highly efficiently.

(2) The separating member may further have a third unit region, the second opening region may further include a third portion located in the third unit region, the shortest distance between the first portion and the first opening region may be larger than a shortest distance between the third portion and the first opening region, and the aperture ratio of the first portion in the first unit region may be larger than an aperture ratio of the third portion in the third unit region.

In this case, during temperature adjustment of gas by the heat exchanger, yet another portion of a circulating gas flows through a portion (hereinafter referred to as a third space portion) located between the third portion in the second opening region and the first opening region of the separating member in the temperature adjustment space.

Here, the shortest distance between the first portion in the second opening region and the first opening region of the separating member is larger than the shortest distance between the third portion in the second opening region and the first opening region of the separating member. In this case, when gas flows between the first opening region and the second opening region, a difference is generated between a pressure in the first space portion and a pressure in the third space portion. Therefore, a flow rate of gas flowing in the first space portion tends to be smaller than a flow rate of gas flowing in the third space portion.

In regard to such tendency, with the above-mentioned configuration, because the aperture ratio of the first portion is larger than the aperture ratio of the third portion, the flow rates of gas flowing in the first and third space portions can be made uniform. Therefore, the temperatures of gas flowing in the first, second and third space portions can be adjusted to a uniform temperature by the heat exchanger, and efficiency of temperature adjustment by the heat exchanger is improved. As a result, the temperature in the sample storage space can be adjusted more highly efficiently.

(3) The second portion may extend in a first direction from the first portion, the third portion may extend in a second direction that intersects with the first direction from the first portion, the first unit region and the second unit region may be arranged in the first direction, the first unit region and the third unit region may be arranged in the second direction, the separating member may further include a fourth unit region that is adjacent to the third unit region in the first direction and adjacent to the second unit region in the second direction, and the first opening region may be located in the fourth unit region.

In this case, in the separating member, the first unit region and the second unit region are arranged in the first direction, the first unit region and the third unit region are arranged in the second direction, the second unit region and the fourth unit region are arranged in the second direction, and the third unit region and the fourth unit region are arranged in the first direction. Thus, an increase in size of the separating member in one of the first direction and the second direction is suppressed. Therefore, an increase in size of the autosampler in one direction is suppressed.

(4) A width of at least part of the first portion in a direction of an airflow generated between the first opening region and the first portion in the second opening region by the circulation device may be larger than a width of the second portion in a direction of an airflow generated between the first opening region and the second portion in the second opening region by the circulation device.

In this case, flow rates of gas flowing in the above-mentioned first space portion and second space portion can be made uniform with a simple configuration.

(5) A width of at least part of the first portion in a direction of an airflow generated between the first opening region and the first portion in the second opening region by the circulation device may be larger than a width of the third portion in a direction of an airflow generated between the first opening region and the third portion in the second opening region by the circulation device.

In this case, flow rates of gas flowing in the above-mentioned first space portion and third space portion can be made uniform with a simple configuration.

(6) The heat exchanger may have a first side extending in the first direction and a second side extending in the second direction, the first and third portions may have a first edge extending in parallel with the first side, and the second and third portions may have a second edge extending in parallel with the second side.

In this case, in the temperature adjustment space, gas can flow in the second direction from the first side of the heat exchanger. Further, gas can flow in the first direction from the second side of the heat exchanger. Thus, because gas can flow throughout the entire heat exchanger, the temperature in the sample storage space can be adjusted even more highly efficiently.

Advantageous Effects of Invention

The present invention enables highly efficient adjustment of temperature in a space storing a sample.

DESCRIPTION OF EMBODIMENTS

An autosampler according to one embodiment of the present invention will be described below with reference to the drawings. The autosampler according to the present embodiment is used to inject a sample into a mobile phase supplied to a column of a chromatograph.

[1] Basic Configuration of Autosampler

Figure 1:
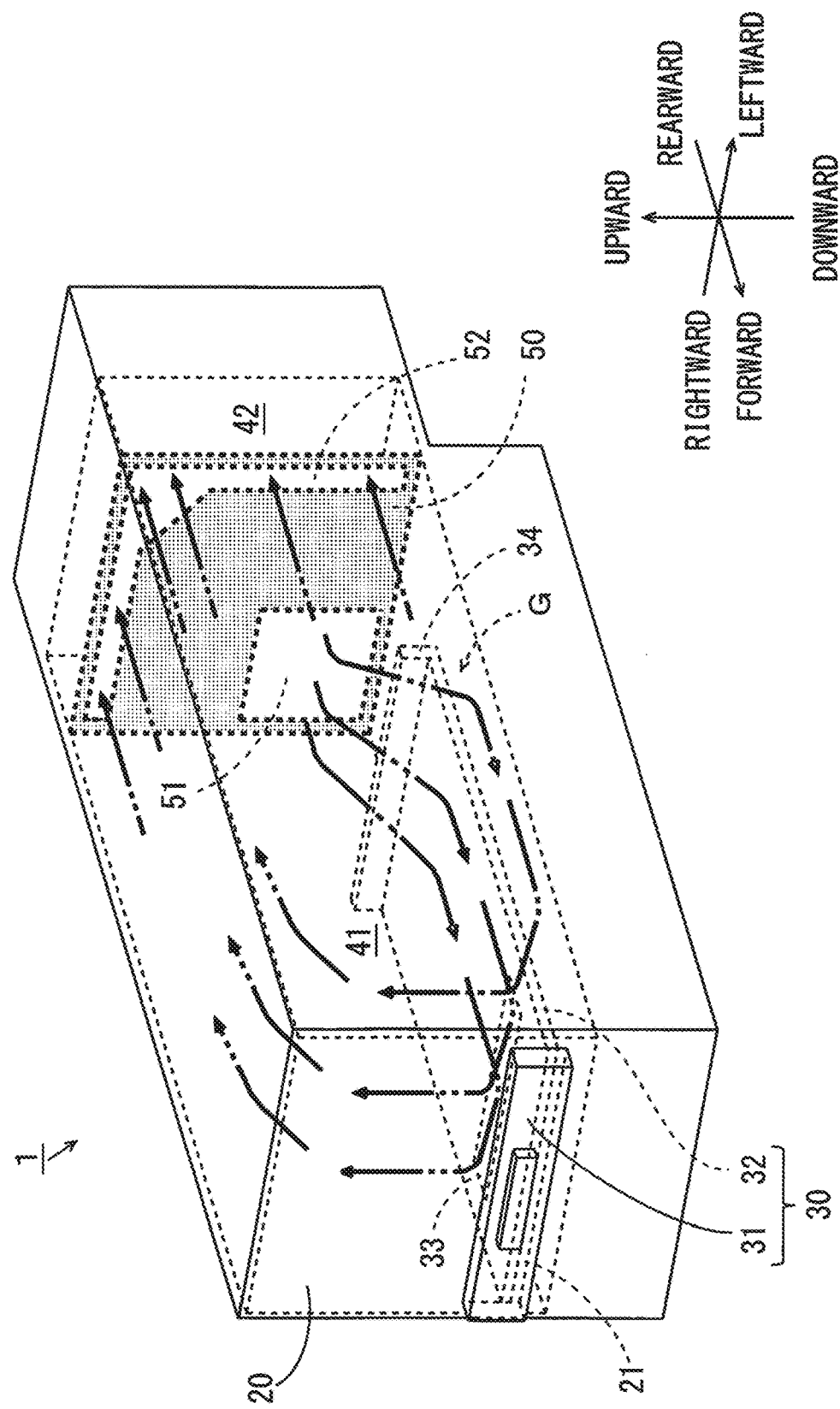
FIG. 1 is a schematic perspective view of an autosampler according to one embodiment of the present invention.
Figure 2:
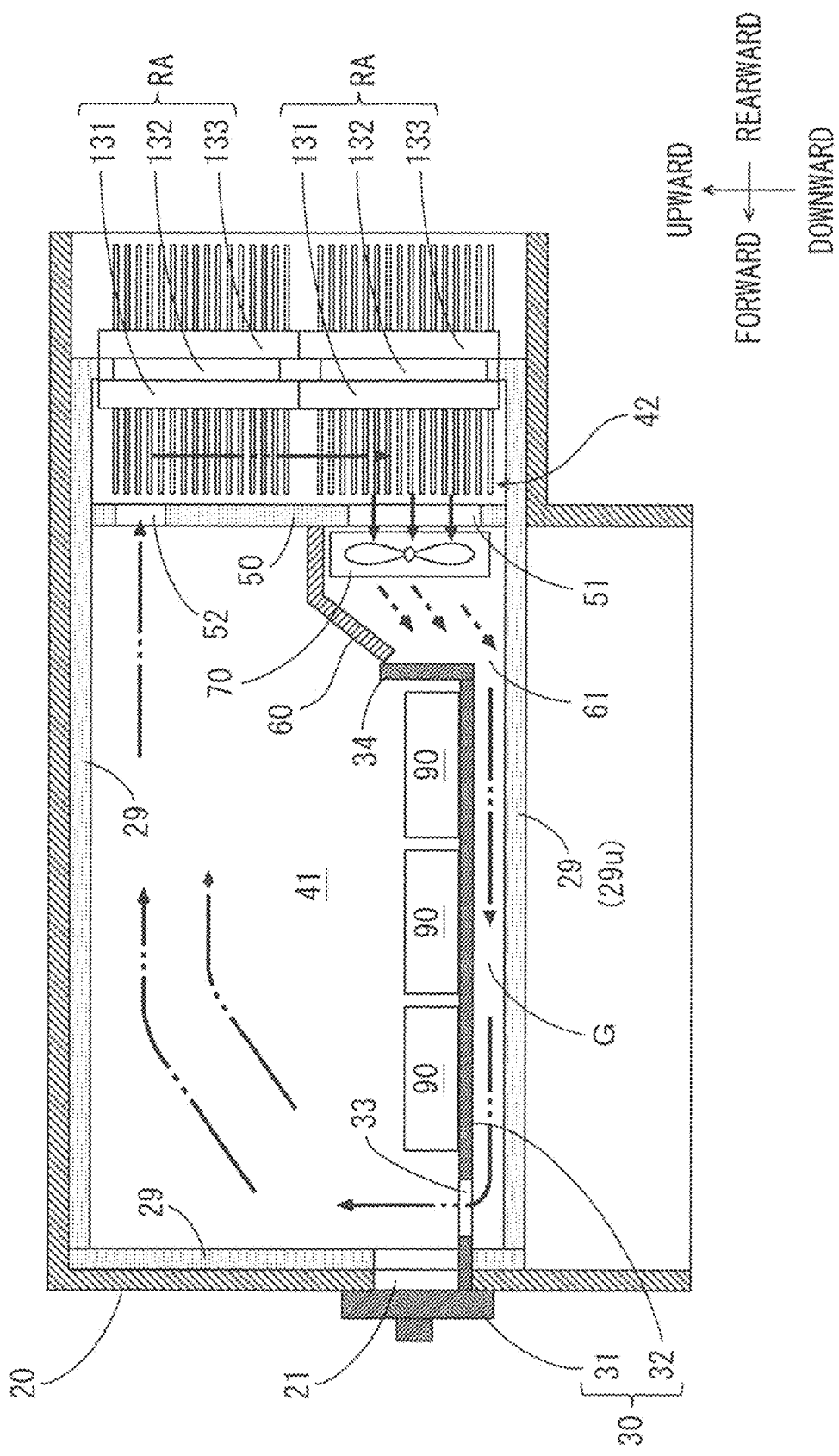
FIG. 2 is a schematic longitudinal cross sectional view of the autosampler of FIG. 1.

FIG. 1 is a schematic perspective view of the autosampler according to the one embodiment of the present invention, and FIG. 2 is a schematic longitudinal cross sectional view of the autosampler 1 of FIG. 1. In FIG. 1, part of the inner configuration of the autosampler 1 is indicated by dotted lines.

As shown in FIG. 2, the autosampler 1 has a casing 20 that is formed to extend in one direction. In the casing 20, a sample storage space 41 and a temperature adjustment space 42 are formed to be arranged in a direction in which the casing 20 extends. Hereinafter, a direction directed from the temperature adjustment space 42 toward the sample storage space 41 is referred to as forward of the autosampler 1, and an opposite direction is referred to as rearward of the autosampler 1. Further, a direction that is orthogonal to a front-and-rear direction and an up-and-down direction with the center of the autosampler 1 as a basis is referred to as a left-and-right direction.

The sample storage space 41 is a space for storing a sample to be analyzed by the chromatograph. The temperature adjustment space 42 is a space used to adjust the temperature of a sample stored in the sample storage space 41.

In the casing 20, a plurality of thermal insulators 29 are provided to cover the sample storage space 41 from the front and cover the sample storage space 41 and the temperature adjustment space 42 from above, below, the right and the left. A thermal insulation board 50 having a rectangular shape is provided between the sample storage space 41 and the temperature adjustment space 42 to be orthogonal to the front-and-rear direction. The plurality of thermal insulators 29 and the thermal insulation board 50 are formed of a polyethylene resin foaming material, for example. In the following description, a thermal insulator 29 that covers the sample storage space 41 from below out of the plurality of thermal insulators 29 is referred to as a lower thermal insulator 29u.

The sample storage space 41 and the temperature adjustment space 42 are separated by the thermal insulation board 50 in the casing 20. Two openings 51, 52 that cause the sample storage space 41 and the temperature adjustment space 42 to communicate with each other are formed in the thermal insulation board 50.

In FIG. 1, the thermal insulation board 50 is indicated by the thick dotted lines and a dotted pattern in order to facilitate understanding of the shape of the thermal insulation board 50. One opening 51 is formed in a lower right portion of the thermal insulation board 50. The other opening 52 is formed to have a substantially L shape to extend from an upper left portion to an upper right portion of the thermal insulation board 50 and extend from an upper left portion to a lower left portion of the thermal insulation board 50. Details of the thermal insulation board 50 will be described below.

As shown in FIG. 2, in the sample storage space 41, a fan 70 is provided forwardly of the thermal insulation board 50 to be in close proximity to a front surface of the thermal insulation board 50 and overlap with the opening 51 in the front-and-rear direction. The fan 70 of the present example is configured to be capable of supplying air in the temperature adjustment space 42 to the sample storage space 41 through the opening 51.

Further, an air guiding member 60 for guiding air flowing forwardly from the fan 70 to a position below the sample storage space 41 is provided at the front surface of the thermal insulation board 50. The air guiding member 60 extends forwardly from the front surface of the thermal insulation board 50 by a certain distance.

In the front end portion of the casing 20, an opening 21 through which a plurality of sample plates 90 are taken in and out between a position farther forward than the casing 20 and the sample storage space 41 is formed. Each sample plate 90 is a plate configured to be capable of holding a plurality of sample vials or a plurality of samples. The opening 21 is formed at a position farther upward than the lower thermal insulator 29u by a certain height. Further, the opening 21 is formed to extend in the left-and-right direction.

The autosampler 1 includes a sample rack 30. The sample rack 30 is configured to be insertable into the sample storage space 41 through the opening 21 from a position farther forward than the casing 20 and drawable to a position farther forward than the casing 20 from the sample storage space 41 through the opening 21.

The sample rack 30 has a front board portion 31 and a bottom board portion 32. The front board portion 31 has one surface configured to be capable of closing an opening 21 of the casing 20 and another surface configured be holdable by a user. The bottom board portion 32 is constituted by a board-shaped member that can support the plurality (three in the example of FIG. 2) of sample plates 90 and provided to extend in a direction in which the one surface is directed from the one surface of the front board portion 31. An opening 33 is formed in a portion, located in the vicinity of the front board portion 31, in the bottom board portion 32 to extend from a position in the vicinity of one side to a position in the vicinity of the other side of the bottom board portion 32.

An air guiding board 34 is attached to the tip of the bottom board portion 32. The air guiding board 34 projects upwardly from the tip of the bottom board portion 32 and extends from the one side to the other side of the bottom board portion 32.

The user places the plurality of sample plates 90 on the bottom board portion 32 of the sample rack 30 and inserts the bottom board portion 32 into the opening 21 while holding the front board portion 31. Thus, the one surface of the front board portion 31 closes the opening 21, a gap G is formed between the bottom board portion 32 and the lower thermal insulator 29u and the air guiding board 34 abuts against the front end of the air guiding member 60. In this state, the sample rack 30 is fixed to the casing 20, and the plurality of sample plates 90 are stored in the sample storage space 41.

On the other hand, the user holds the front board portion 31 of the sample rack 30 and draws the sample rack 30 to a position farther forward than the autosampler 1. Thus, the plurality of sample plates 90 are taken out from the sample storage space 41.

At a position farther rearward than the thermal insulation board 50, a plurality (four in the present example) of radiators RA are provided to be arranged upwardly, downwardly, leftwardly and rightwardly. As shown in FIG. 2, each radiator RA includes two heat exchanging fins 131, 133 and a temperature adjusting element 132. The temperature adjusting element 132 is a peltier element, for example, and has two heat transfer surfaces directed in opposite directions to each other. One heat exchanging fin 131 is attached to one heat transfer surface of the temperature adjusting element 132, and the other heat exchanging fin 133 is attached to the other heat transfer surface of the temperature adjusting element 132.

One heat exchanging fin 131 of each radiator RA is arranged in the temperature adjustment space 42, and the other heat exchanging fin 133 of each radiator RA is arranged rearwardly of the temperature adjustment space 42. In the present embodiment, the rear end of the casing 20 is opened. Thus, the other heat exchanging fin 133 of each radiator RA is exposed rearwardly of the autosampler 1. When the temperature adjusting element 132 of each radiator RA is driven, heat is exchanged between the two heat exchanging fins 131, 133 of the radiator RA, and the temperature of air flowing in the temperature adjustment space 42 is adjusted.

With the sample rack 30 inserted into the casing 20, the fan 70 operates while the temperature of air in the temperature adjustment space 42 is adjusted. In this case, as indicated by the thick two-dotted and dash lines in FIGS. 1 and 2, air the temperature of which is adjusted in the temperature adjustment space 42 is supplied to the sample storage space 41 through the opening 51. The air supplied to the sample storage space 41 is guided to the above-mentioned gap G from the fan 70 by the air guiding member 60 and the air guiding board 34. Further, air guided to the gap G flows forwardly and flows to a position above the bottom board portion 32 through the opening 33 in the vicinity of the front board portion 31. Further, air located above the bottom board portion 32 flows toward the opening 52 of the thermal insulation board 50. In this manner, air circulates between the sample storage space 41 and the temperature adjustment space 42.

The temperature of the space surrounding the plurality of sample plates 90 is adjusted by the air flowing through the gap G and air guided to a position above the bottom board portion 32. Thus, the temperature of a plurality of samples held by each sample plate 90 is adjusted (heated, cooled or maintained) together with a sample plate 90 supported by the sample rack 30.

In the sample storage space 41, an injection device (not shown) for injecting the plurality of samples held by each sample plate 90 into a mobile phase used by a chromatograph is provided.

[2] Adjustment of Temperature of Air by Radiators RA and Configuration of Thermal Insulation Board 50

Figure 3:
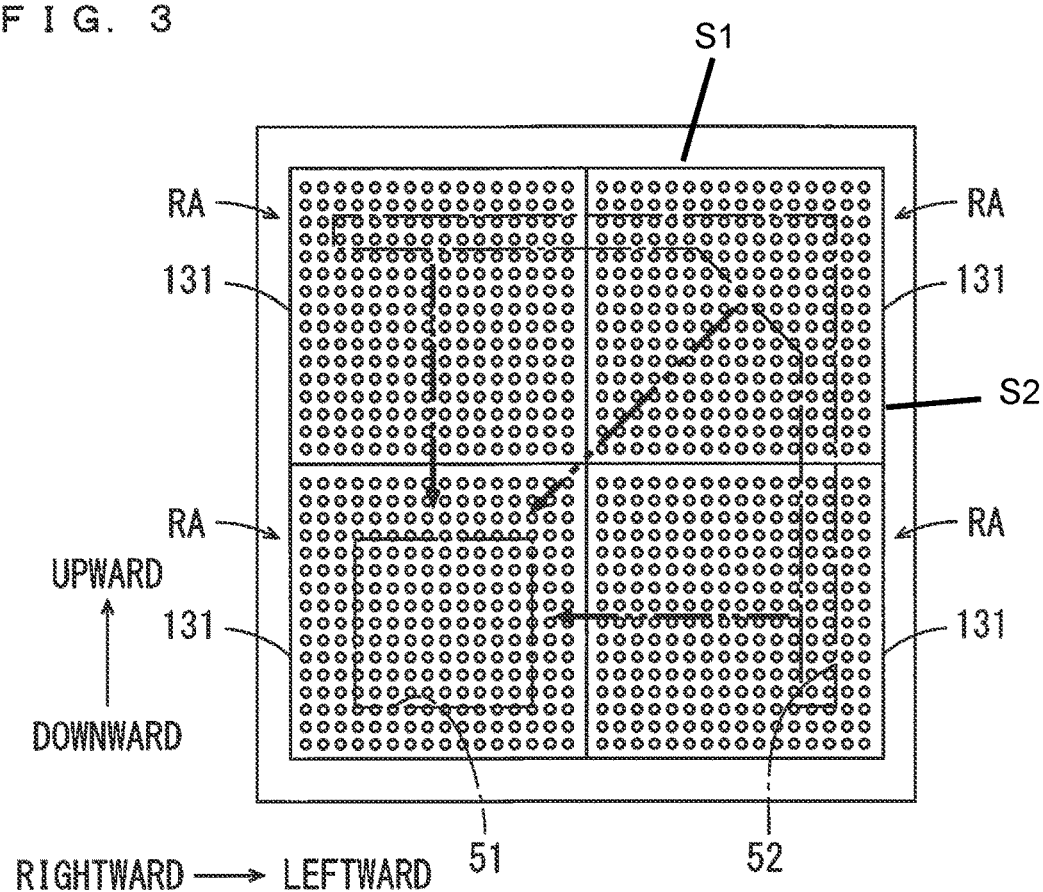
FIG. 3 is a front view of a plurality of radiators as viewed through transparent thermal insulation board, air guiding member and fan from a sample storage space.

FIG. 3 is a front view of the plurality of radiators RA as viewed from the sample storage space 41 through the transparent thermal insulation board 50, air guiding member 60 and fan 70. As shown in FIG. 3, each radiator RA is provided such that one heat exchanging fin 131 is directed forward. The heat exchanging fin 131 has a configuration in which a plurality of bar-shape pins are provided in a square base portion to be arranged in the shape of a matrix. The other heat exchanging fin 133 (FIG. 2) has the same configuration as the heat exchanging fin 131 of FIG. 3.

In FIG. 3, the openings 51, 52 of the thermal insulation board 50 attached to a position farther forward than the plurality of radiators RA are indicated by the one-dot and dash lines. Further, an exemplary flow of gas in the temperature adjustment space 42 in a case where air circulates between the sample storage space 41 and the temperature adjustment space 42 is indicated by the thick two-dots and dash arrows.

Figure 4:
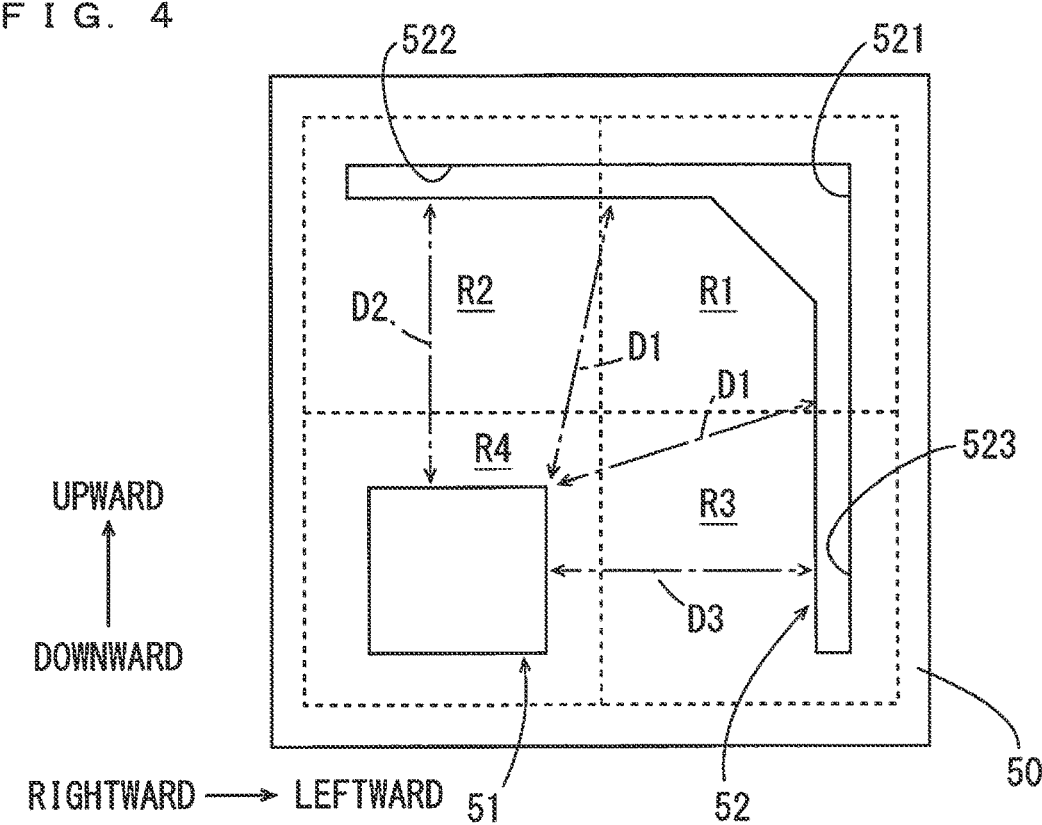
FIG. 4 is a front view of the thermal insulation board as viewed through the transparent air guiding member and fan from the sample storage space.

FIG. 4 is a front view of the thermal insulation board 50 as viewed from the sample storage space 41 through the transparent air guiding member 60 and fan 70. As indicated by the dotted lines in FIG. 4, the thermal insulation board 50 has a first unit region R1, a second unit region R2, a third unit region R3 and a fourth unit region R4 that are adjacent to one another to surround its center.

The first unit region R1 is located at an upper left position in the thermal insulation board 50, the second unit region R2 is located at an upper right position in the thermal insulation board 50, the third unit region R3 is located at a lower left position in the thermal insulation board 50 and the fourth unit region R4 is located at the lower right position in the thermal insulation board 50. Thus, the first unit region R1 and the second unit region R2 are arranged in the left-and-right direction, and the first unit region R1 and the third unit region R3 are arranged in the up-and-down direction. Further, the second unit region R2 and the fourth unit region R4 are arranged in the up-and-down direction, and the third unit region R3 and the fourth unit region R4 are arranged in the left-and-right direction.

The first to fourth unit regions R1 to R4 respectively overlap with the four radiators RA of FIG. 3 in the front-and-rear direction. The first to fourth unit regions R1 to R4 has equal areas and has equal shapes.

The one opening 51 is formed to be located in the fourth unit region R4. Further, the other opening 52 is formed to be located in the first unit region R1, the second unit region R2 and the third unit region R3.

A portion located in the first unit region R1 in the opening 52 is referred to as a first portion 521. A portion located in the second unit region R2 in the opening 52 is referred to as a second portion 522. A portion located in the third unit region R3 in the opening 52 is referred to as a third portion 523.

The shortest distance D1 between the first portion 521 and the opening 51 is larger than the shortest distance D2 between the second portion 522 and the opening 51 and the shortest distance D3 between the third portion 523 and the opening 51.

In the first unit region R1, the first portion 521 extends rightwardly and downwardly from a position in the vicinity of one corner (the upper left corner) that is at the farthest distance from the center of the thermal insulation board 50 out of the four corners in the first unit region R1. The upper edge (first edge) of the first portion 521 extends in the left-and-right direction to be in parallel with a first side S1 of the heat exchanger 131 and the upper side of the upper left radiator RA of FIG. 3 at a position in the vicinity of the upper side. Further, the left edge (second edge) of the first portion 521 extends in the up-and-down direction to be in parallel with a second side S2 of the heat exchanger 131 and the left side of the upper left radiator RA of FIG. 3 at a position in the vicinity of the left side.

In the second unit region R2, the second portion 522 extends rightwardly from the first portion 521 in the first unit region R1. The width of the second portion 522 in the up-and-down direction is constant. Further, the upper edge (first edge) of the second portion 522 extends in the left-and-right direction to be in parallel with the first side S1 of the heat exchanger 131 and the upper side of the upper right radiator RA of FIG. 3 at a position in the vicinity of the upper side.

In the third unit region R3, the third portion 523 extends downwardly from the first portion 521 in the first unit region R1. The width of the third portion 523 in the left-and-right direction is constant and equal to the width of the second portion 522 in the up-and-down direction. Further, the left edge (second edge) of the third portion 523 extends in the up-and-down direction to be in parallel with the second side S2 of the heat exchanger 131 and the left side of the lower left radiator RA of FIG. 3 at a position in the vicinity of the left side.

Here, in the first portion 521, a bending portion between a portion having a constant width and extending in the left-and-right direction and a portion having a constant width and extending in the up-and-down direction forms a substantially triangular shape. Therefore, the width of the bending portion (the width in the direction of a diagonal line that connects a lower right top and an upper left top of the thermal insulation board 50 to each other) is larger than the above-mentioned width of each of the second portion 522 and the third portion 523. With such a configuration, the aperture ratio of the first portion 521 in the first unit region R1 is larger than each of the aperture ratio of the second portion 522 in the second unit region R2 and the aperture ratio of the third portion 523 in the third unit region R3.

[3] Effects of Embodiment (a) In the following description, in the temperature adjustment space 42 of FIGS. 1 and 2, the portion located between the first portion 521 and the opening 51 of the thermal insulation board 50 in a front view is referred to as a first space portion. The portion located between the second portion 522 and the opening 51 of the thermal insulation board 50 in a front view is referred to as a second space portion. The portion located between the third portion 523 and the opening 51 of the thermal insulation board 50 in a front view is referred to as a third space portion.

As described above, the shortest distance D1 between the first portion 521 and the opening 51 is larger than each of the shortest distance D2 between the first portion second portion 522 and the opening 51 and the shortest distance D3 between the third portion 523 and the opening 51. In this case, when gas flows between the opening 51 and the opening 52, a difference is generated between a pressure generated in the first space portion and a pressure generated in the second and third space portions. Therefore, a flow rate of gas flowing in the first space portion tends to be smaller than a flow rate of gas flowing in each of the second and third space portions. A flow rate of gas refers to an amount of gas flowing in a subject space per unit time.

As such, in the present embodiment, as described above, the thermal insulation board 50 is formed such that the aperture ratio of the first portion 521 in the first unit region R1 is larger than the aperture ratio of the second portion 522 in the second unit region R2. Further, the thermal insulation board 50 is formed such that the aperture ratio of the first portion 521 in the first unit region R1 is larger than the aperture ratio of the third portion 523 in the third unit region R3.

In this case, a flow rate of gas flowing in the first space portion can be increased. Thus, a flow rate of gas flowing in each of the first, second and third space portions can be made uniform. Therefore, the temperatures of gas flowing in the first, second and third space portions can be adjusted to a uniform temperature by the plurality of radiators RA, and efficiency of temperature adjustment by the radiators RA is improved. As a result, the temperature in the sample storage space 41 can be adjusted highly efficiently. Therefore, a sample stored in the sample storage space 41 can be adjusted to a desired temperature in a short period of time.

(b) Further, in the above-mentioned thermal insulation board 50, the one opening 51 is located in the fourth unit region R4, and the other opening 52 is located in the first unit region R1, the second unit region R2 and the third unit region R3 that are arranged upwardly, obliquely upwardly (leftwardly and upwardly) and sidewardly (leftwardly) of the fourth unit region R4. Thus, an increase in size of the thermal insulation board 50 only in one direction is suppressed. Therefore, an increase in size of the autosampler 1 in one direction is suppressed.

(c) Further, with the above-mentioned configuration, the upper edges of the first portion 521 and the second portion 522 extend in the left-and-right direction to be in parallel with upper sides of the upper left and upper right radiators RA of FIG. 3 at a position in the vicinity of the upper sides. In this case, air can flow from above toward below throughout the entire radiators RA that are arranged leftwardly and rightwardly. Further, the left edges of the first portion 521 and the third portion 523 extend in the up-and-down direction to be in parallel with the left sides of the upper left and lower left radiators RA of FIG. 3 at a position in the vicinity of the left sides. In this case, air can flow from the left toward the right throughout the entire radiators RA that are arranged upwardly and downwardly. Therefore, because air can flow throughout the plurality of entire radiators RA, the temperature in the sample storage space 41 can be adjusted more highly efficiently.

[4] Temperature Distribution of Plurality of Heat Exchanging Fins 131

The inventors of the present invention fabricated a thermal insulation board 50 according to an inventive example and fabricated an autosampler 1 including the thermal insulation board 50 in order to confirm a change in temperature distribution of a plurality of heat exchanging fins 131 in accordance with the shape of an opening 52 formed in the thermal insulation board 50.

Figure 5:
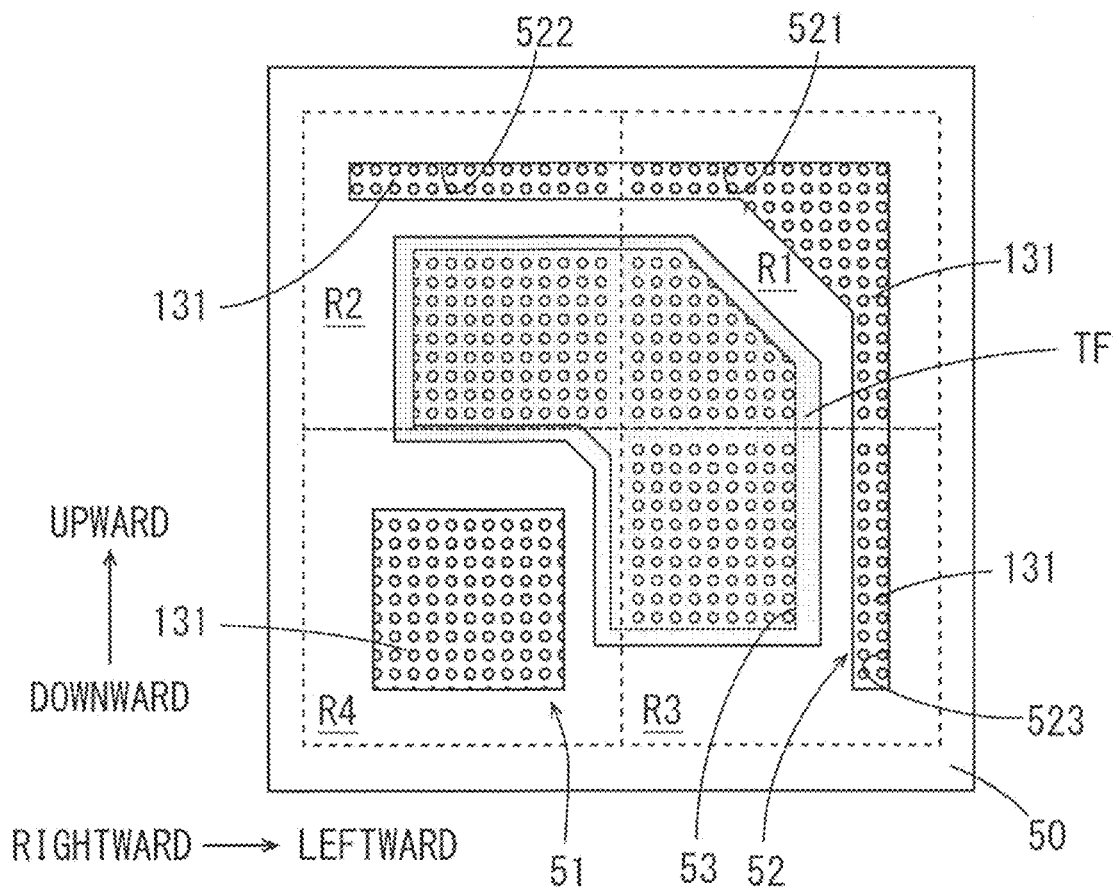
FIG. 5 is a front view of a thermal insulation board according to an inventive example as viewed through transparent air guiding member and fan from a sample storage space.

FIG. 5 is a front view of the thermal insulation board 50 according to the inventive example as viewed through transparent air guiding member 60 and fan 70 from a sample storage space 41. In FIG. 5, the heat exchanging fins 131 of the plurality of radiators RA (FIG. 2) located rearwardly of the thermal insulation board 50 in a visible range are shown in addition to the thermal insulation board 50.

In the thermal insulation board 50 of FIG. 5, a new opening 53 is formed between the opening 51 and the opening 52 as compared to the thermal insulation board 50 of FIG. 4. The entire opening 53 is closed by a transparent film TF. Thus, the conditions of the surfaces of the upper left, upper right and lower left heat exchanging fins 131 can be viewed from the sample storage space 41. In FIG. 5, the transparent film TF is indicated by a thin dotted pattern.

With the configuration of FIG. 5, during an operation of the fan 70, air flows in the temperature adjustment space 42 similarly to the example of FIG. 3 in which air flows are indicated by the thick two-dots and dash arrows. In this state, the inventors of the present invention measured temperature distribution of the plurality of radiators RA (the heat exchanging fins 131) during temperature adjustment using thermography.

Figure 6:
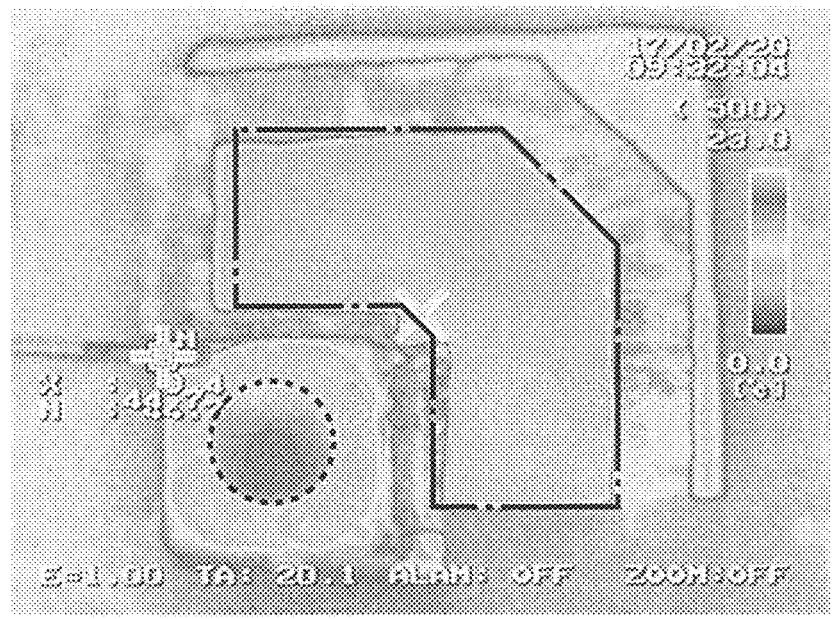
FIG. 6 is a diagram showing temperature distribution of a plurality of radiators of to an autosampler according to the inventive example.

FIG. 6 is a diagram showing the temperature distribution of the plurality of radiators RA of the autosampler 1 according to the inventive example. In FIG. 6, the temperature distribution of the plurality of radiators RA is shown by a thermographic image. In FIG. 6, the portion surrounded by the thick one-dot and dash line corresponds to the opening 53 of FIG. 5, and the temperature distribution is shown in greyscale. The portion surrounded by the thick dotted line in FIG. 6 corresponds to a component of the fan 70 (a motor, for example) provided forwardly of the thermal insulation board 50.

According to the thermographic image of FIG. 6, large variations in temperature distribution are not present among the plurality of radiators RA. Thus, with the autosampler 1 according to the present embodiment, it is found that the temperature of gas flowing in the temperature adjustment space 42 can be adjusted to a uniform temperature by the plurality of radiators RA, and efficiency of temperature adjustment by the plurality of radiators RA is improved.

Figure 7:
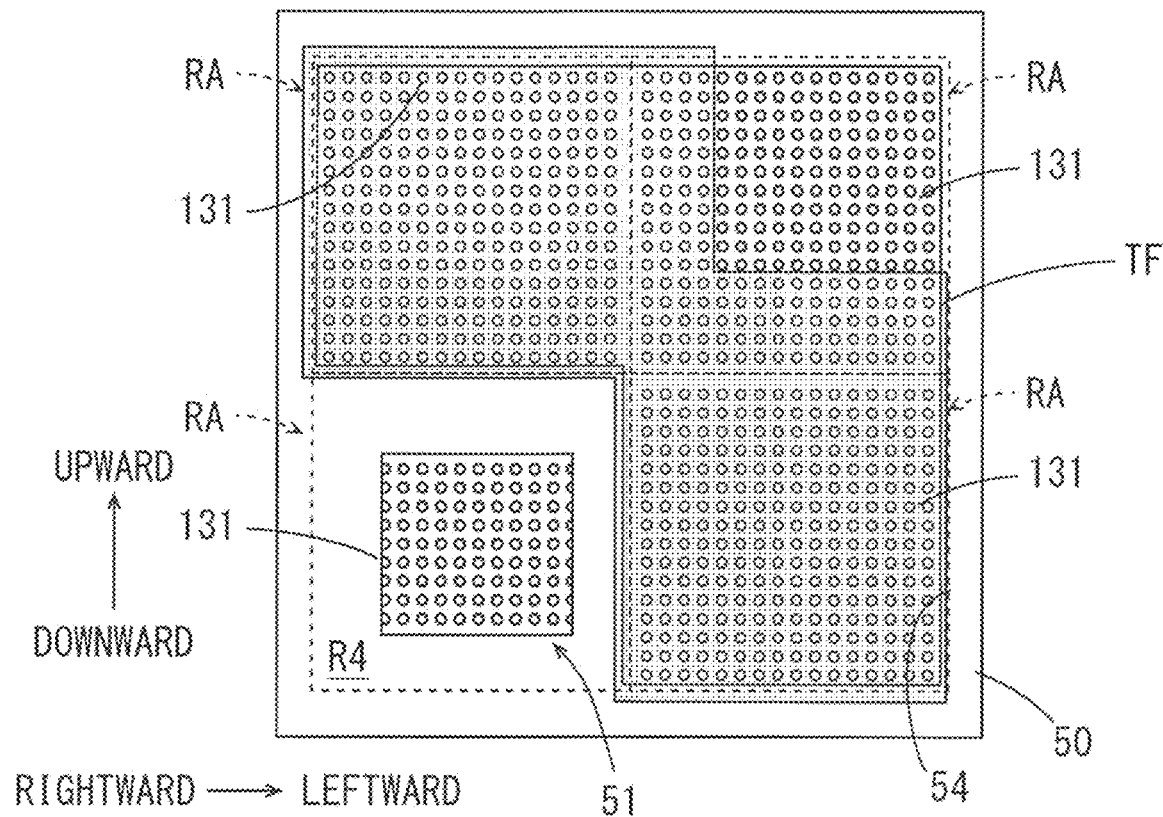
FIG. 7 is a front view of a thermal insulation board according to a comparative example as viewed through transparent air guiding member and fan from a sample storage space.

Further, the inventors of the present invention fabricated a thermal insulation board 50 according to a comparative example and fabricated an autosampler 1 including the thermal insulation board 50. FIG. 7 is a front view of the thermal insulation board 50 according to the comparative example as viewed through transparent air guiding member 60 and fan 70 from a sample storage space 41. In FIG. 7, heat exchanging fins 131 of a plurality of radiators RA (FIG. 2) located rearwardly of a thermal insulation board 50 in a visible range are shown in addition to the thermal insulation board 50.

In the thermal insulation board 50 of FIG. 7, a large opening 54 is formed over the region of the first unit region R1, the second unit region R2 and the third unit region R3 of FIG. 4 instead of the opening 52 of the thermal insulation board 50 of FIG. 4.

The opening 54 is closed by a transparent film TF except for one upper left portion. Thus, the conditions of the surfaces of the upper left, upper right and lower left heat exchanging fins 131 can be viewed from the sample storage space 41. In FIG. 7, the transparent film TF is indicated by the thin dotted pattern similarly to the example of FIG. 5.

With the configuration of FIG. 7, during an operation of the fan 70, air flows between the opening 51 and one upper left portion of the opening 54 (a portion that is not closed by the transparent film TF in the opening 54). In this case, in the temperature adjustment space 42, although gas mainly flows in a portion located on a diagonal line connecting an upper left corner and a lower right corner to each other, gas is unlikely to flow in other portions. In this state, the inventors of the present invention measured temperature distribution of the plurality of radiators RA (the heat exchanging fins 131) during temperature adjustment through the thermal insulation board 50 of the comparative example using thermography.

Figure 8:
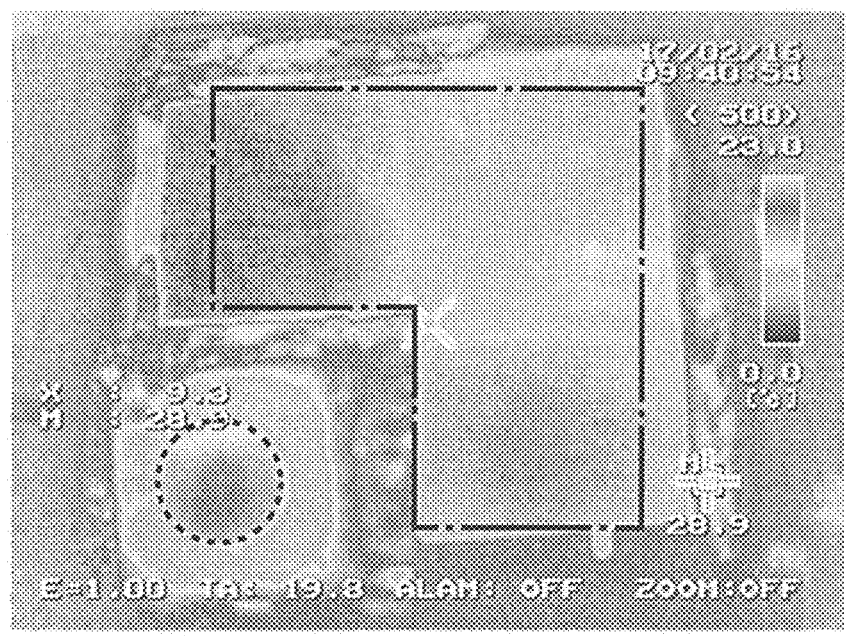
FIG. 8 is a diagram showing temperature distribution of a plurality of radiators of an autosampler according to the comparative example.

FIG. 8 is a diagram showing the temperature distribution of the plurality of radiators RA of the autosampler 1 according to the comparative example. In FIG. 8, the temperature distribution of the plurality of radiators RA is shown by a thermographic image. In FIG. 8, the portion surrounded by the thick one-dot and dash line corresponds to the opening 54 of FIG. 7, and the temperature distribution is shown in greyscale. The portion surrounded by the thick dotted line in FIG. 8 corresponds to a component (a motor, for example) of the fan 70 provided forwardly of the thermal insulation board 50.

According to the thermographic image of FIG. 8, relatively large variations in temperature distribution are present among the plurality of radiators RA. Specifically, it is found that the temperatures of the lower left and upper right radiators RA are lower than the temperatures of the upper left and lower right radiators RA. These variations in temperature distribution indicate that heat is exchanged uniformly among the plurality of radiators RA. From this result, it is found that the temperatures of air cannot be adjusted to a uniform temperature by the plurality of radiators RA in a case where the air does not flow at a uniform flow rate in a plurality of portions in the temperature adjustment space 42.

[5] Other Embodiments (a) While the two openings 51, 52 for causing air to circulate between the sample storage space 41 and the temperature adjustment space 42 are formed in the one thermal insulation board 50 in the above-mentioned embodiment, the present invention is not limited to this.

The above-mentioned thermal insulation board 50 functions as a separating member that separates the sample storage space 41 and the temperature adjustment space 42 from each other. In a case where a plurality of separating members that separate the sample storage space 41 and the temperature adjustment space 42 from each other are present, two openings 51, 52 may be formed in each of the plurality of separating members.

Figure 9:
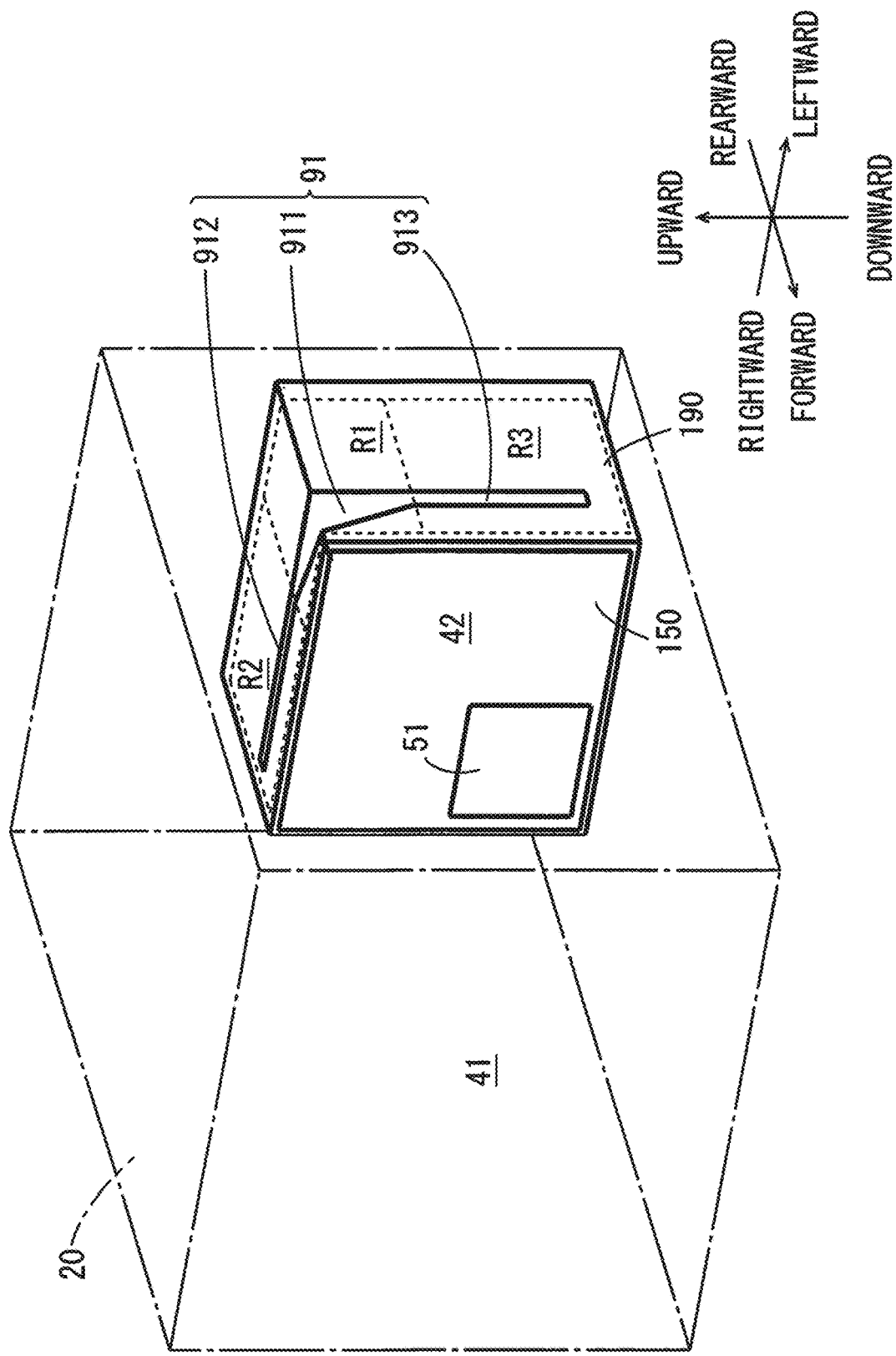
FIG. 9 is a schematic perspective view showing part of an autosampler according to another embodiment.

FIG. 9 is a schematic perspective view showing part of an autosampler 1 according to another embodiment. In FIG. 9, a casing 20 is indicated by the one-dot and dash lines, and the configuration of a plurality of separating members that separate a sample storage space 41 and a temperature adjustment space 42 from each other in the casing 20 is indicated by the thick solid lines.

In the autosampler 1 of FIG. 9, a thermal insulation board 150 and a thermal insulation member 190 are provided in the casing 20 as the plurality of separating members for separating the sample storage space 41 and the temperature adjustment space 42 from each other. The thermal insulation board 150 is rectangular similarly to the above-mentioned thermal insulation board 50 and is provided in the casing 20 to be orthogonal to the front-and-rear direction. The thermal insulation member 190 has a square-tube shape and is formed to extend rearwardly from the upper, lower, left and right four sides of the thermal insulation board 50. The rear end of the thermal insulation member 190 is located at the rear end of the casing 20. The thermal insulation board 150 and the thermal insulation member 190 are formed of a polyethylene resin foaming material, for example.

The space located rearwardly of the thermal insulation board 150 and surrounded by the thermal insulation member 190 is the temperature adjustment space 42. In the temperature adjustment space 42, heat exchanging fins 131 of a plurality of radiators RA are arranged similarly to the example of the above-mentioned embodiment.

With such a configuration, an opening 51 is formed in the thermal insulation board 150, and an opening 91 is formed in the thermal insulation member 190. In this case, during an operation of a fan 70 (not shown), air in the temperature adjustment space 42 is supplied to the sample storage space 41 through the opening 51, and air in the sample storage space 41 is returned to the temperature adjustment space 42 through the opening 91.

Here, as indicated by the dotted lines in FIG. 9, a first unit region R1, a second unit region R2 and a third unit region R3 that are arranged in a circumferential direction in the thermal insulation member 190 are defined. In a case where the thermal insulation member 190 is viewed from the front, the first unit region R1 is defined to extend rightwardly by a certain distance and extend downwardly by a certain distance with the upper left corner as a center. On the other hand, the second unit region R2 is defined to extend rightwardly from one end of the first unit region R1 on the upper end surface of the thermal insulation member 190, and the third unit region R3 is defined to extend downwardly from the other end of the first unit region R1 on the left side surface of the thermal insulation member 190.

The opening 91 is formed to be located in the first to third unit regions R1 to R3 of FIG. 9. Here, the portion located in the first unit region R1 in the opening 91 is referred to as a first portion 911. The portion located in the second unit region R2 in the opening 91 is referred to as a second portion 912. The portion located in the third unit region R3 in the opening 91 is referred to as a third portion 913.

In the present example, similarly to the above-mentioned embodiment, the shortest distance between the first portion 911 and the opening 51 is larger than each of the shortest distance between the second portion 912 and the opening 51 and the shortest distance between the third portion 913 and the opening 51. Further, the aperture ratio of the first portion 911 in the first unit region R1 is larger than each of the aperture ratio of the second portion 912 in the second unit region R2 and the aperture ratio of the third portion 913 in the third unit region R3. Thus, air can flow uniformly to the plurality of radiators RA in the temperature adjustment space 42, and the effects similar to that of the above-mentioned embodiment can be obtained.

(b) In the above-mentioned thermal insulation board 50, a plurality of holes may be formed dispersively in the region in which the opening 51 is formed instead of formation of the one opening 51. Further, in the above-mentioned thermal insulation board 50, a plurality of holes may be formed dispersively in the region in which the opening 52 is formed instead of formation of the other opening 52. In these cases, each hole may be circular, rectangular or have a slit-shape.

(c) In the above-mentioned embodiment, air having an adjusted temperature is supplied to the sample storage space 41 from the temperature adjustment space 42 through the opening 51 of the thermal insulation board 50, and the air in the sample storage space 41 is returned to the temperature adjustment space 42 through the opening 52. However, the present invention is not limited to this. For example, air having an adjusted temperature may be supplied to the sample storage space 41 from the temperature adjustment space 42 through the opening 52 of the thermal insulation board 50, and the air in the sample storage space 41 may be returned to the temperature adjustment space 42 through the opening 51.

(d) While the plurality of radiators RA are used to adjust the temperature of air in the temperature adjustment space 42 in the above-mentioned embodiment, the present invention is not limited to this. One radiator RA having the same shape or the substantially the same shape as the thermal insulation board 50 in a front view may be used.

(e) While being formed to be substantially square in a front view in the above-mentioned embodiment, the temperature adjustment space 42 may be formed to be oblong in a front view.

[6] Correspondences Between Constituent Elements in Claims and Parts in Preferred Embodiments In the following paragraphs, non-limiting examples of correspondences between various elements recited in the claims below and those described above with respect to various preferred embodiments of the present disclosure are explained.

In the above-mentioned embodiment, a portion of the casing 20 and a portion of the thermal insulator 29 that form the sample storage space 41 are examples of sample storages, a portion of the casing 20 and a portion of the thermal insulator 29 that form the temperature adjustment space 42 are examples of adjustors, the opening 51 is an example of a first opening region, and the openings 52, 91 are examples of second opening regions. Further, the thermal insulation boards 50, 150 and the thermal insulation member 190 are examples of separating members, the fan 70 is an example of a circulation device, and the plurality of radiators RA are an example of heat exchangers.

Further, the direction in which air flows from an upper left position to a lower right position in the temperature adjustment space 42 is an example of a direction of an airflow generated between the first opening region and the first portion in the second opening region by the circulation device, and a direction in which air flows from above toward below in the temperature adjustment space 42 is an example of a direction of an airflow generated between the first opening region and the second portion in the second opening region by the circulation device.

As each of various elements recited in the claims, various other elements having configurations or functions described in the claims can be also used.

The invention claimed is:

1. An autosampler comprising:
a sample storage having a sample storage space;
an adjustor having a temperature adjustment space;
a separating member that has a first opening region and a second opening region and separates the sample storage space and the temperature adjustment space from each other;
a circulation device that causes gas to circulate between the sample storage space and the temperature adjustment space through the first opening region and the second opening region; and
a heat exchanger that adjusts a temperature of gas flowing in the temperature adjustment space, wherein
the separating member has first and second unit regions,
the first and second unit regions have an equal area and an equal shape,
the second opening region includes a first portion located in the first unit region and a second portion located in the second unit region,
a shortest distance between the first portion and the first opening region is larger than a shortest distance between the second portion and the first opening region, and
an aperture ratio of the first portion in the first unit region is larger than an aperture ratio of the second portion in the second unit region.

2. The autosampler according to claim 1, wherein
the separating member further has a third unit region,
the first, second and third unit regions have an equal area and equal shape,
the second opening region further includes a third portion located in the third unit region,
the shortest distance between the first portion and the first opening region is larger than a shortest distance between the third portion and the first opening region, and
the aperture ratio of the first portion in the first unit region is larger than an aperture ratio of the third portion in the third unit region.

3. The autosampler according to claim 2, wherein
the second portion extends in a first direction from the first portion,
the third portion extends in a second direction that intersects with the first direction from the first portion,
the first unit region and the second unit region are arranged in the first direction,
the first unit region and the third unit region are arranged in the second direction, the separating member further includes a fourth unit region that is adjacent to the third unit region in the first direction and adjacent to the second unit region in the second direction, the first, second, third and fourth unit regions have an equal area and equal shape, and the first opening region is located in the fourth unit region.

4. The autosampler according to claim 3, wherein the heat exchanger has a first side extending in the first direction and a second side extending in the second direction, the first and second portions have a first edge extending in parallel with the first side, and the first and third portions have a second edge extending in parallel with the second side.

5. The autosampler according to claim 2, wherein a width of at least part of the first portion in a direction of an airflow generated between the first opening region and the first portion in the second opening region by the circulation device is larger than a width of the third portion in a direction of an airflow generated between the first opening region and the third portion in the second opening region by the circulation device.

6. The autosampler according to claim 1, wherein a width of at least part of the first portion in a direction of an airflow generated between the first opening region and the first portion in the second opening region by the circulation device is larger than a width of the second portion in a direction of an airflow generated between the first opening region and the second portion in the second opening region by the circulation device.

* * * * *